United States Patent

Henck

Patent Number: 6,072,617
Date of Patent: Jun. 6, 2000

[54] MICRO MECHANICAL DEVICE WITH MEMORY METAL COMPONENT

[75] Inventor: Steven A. Henck, Plano, Tex.

[73] Assignee: Texas Instruments Incorporated, Dallas, Tex.

[21] Appl. No.: 08/975,547

[22] Filed: Nov. 20, 1997

[51] Int. Cl.$^7$ .................................................. G02B 26/00
[52] U.S. Cl. .......................................... 359/237; 359/224
[58] Field of Search ..................................... 359/237, 224

[56] References Cited

U.S. PATENT DOCUMENTS

| | | | |
|---|---|---|---|
| 4,662,746 | 5/1987 | Hornbeck | 350/269 |
| 4,874,215 | 10/1989 | Montagu | 350/6.6 |
| 5,061,914 | 10/1991 | Busch et al. | 337/140 |
| 5,589,239 | 12/1996 | Tomono et al. | 428/34 |
| 5,870,007 | 2/1999 | Carr et al. | 333/262 |

FOREIGN PATENT DOCUMENTS 296 15 678 U1  11/1996  Germany .

OTHER PUBLICATIONS

"Nickel—Titanium Memory Metal A 'Smart' Material Exhibiting a Solid–State Phase Change and Superelasticity", Kathleen R. C. Gisser, M.J. Geselbracht, A Cappellari, L. Hunsberger, A.B. Ellis, J. Perepezko, and G.C. Lisensky, *Journal of Chemical Education,* pp. 334–340 (1994).

"Mathematical Model and Experimental Verification of Shape Memory Alloy for Designing Micro Actuator", K. Ikuta, M. Tsukamoto, S. Hirose, *Proceedings of the IEEE on Micro Electro Mechanical Systems,* p. 103 (1991).

"Transformation in Sputter–Deposited Thin Films of NiTi Shape Memory Alloy", Y.Q. Yang, J.S. Jia, Z. F. Zhang, H. M. Shen, A. Hu, and Y. N. Wang, *Materials Letters,* pp. 137–140 (1995).

"Crystallographic Analysis of TiNi Shape Memory Alloy Thin Film for Micro Actuator", K. Ikuta, H. Fujita, M. Ikuta, H. Fujita, M. Ikeda, and S. Yamashita, *Proccedings of the IEEE,* p. 38 (Apr. 1990).

"Vacuum Conditions for Sputtering Thin Film TiNi", A Jardine, Dept. of Materials Science and Engineering (No Date Available).

"Smart Thin Film TiNi/Piezoelectric Heterostructures", P.G. Mercado and A.P. Jardine, Dept. of Materials and Science Engineering (No Date Available).

*Primary Examiner*—Georgia Epps
*Assistant Examiner*—Evelyn A. Lester
*Attorney, Agent, or Firm*—Charles A. Brill; Wade James Brady, III; Frederick J. Telecky, Jr.

[57] ABSTRACT

A method of preventing permanent deformation of deflecting metal components of micro mechanical devices, such as hinges (12) of mirror elements (10) of a digital micro mirror device. The hinges (12) are made from a memory metal capable of undergoing austenite/martensite phase transitions. If the device is operated and the hinges (12) become mechanically distorted, the hinges (12) can be heated to cause a transition to the austenite phase and a return to their original shape.

26 Claims, 2 Drawing Sheets

MICRO MECHANICAL DEVICE WITH MEMORY METAL COMPONENT

TECHNICAL FIELD OF THE INVENTION

This invention generally pertains to micro mechanical devices, and more particularly to fabrication of such devices using a memory metal.

BACKGROUND OF THE INVENTION

A recent development in the field of electro-mechanics has been the miniaturization of various mechanical devices. These "micro mechanical" devices are manufactured using integrated circuit techniques. They often have components made by depositing a thin metal film. The film may be etched or otherwise shaped so as to give the component its desired structure.

When these thin metal components are a moving mechanism, such as a hinge, creep and sagging can be a problem. The size and mechanical considerations constrain the films from which these components are made to thicknesses and linear dimensions that allow the components to distort a significant fraction of their dimensions.

One approach to solving the distortion problem is to manufacture components from "memory metals". A characteristic of these metals is that they can undergo phase changes while in the solid state. One class of these phase changes is the transition between an austenite phase and a martensite phase. As a result, the solid exhibits two phases with different structures and physical properties. Mechanical distortion that occurs during the martensite phase can be reversed. An excellent discussion of nickel titanium, a type of memory metal, is set out in an article by Gisser, et al., "Nickel-Titanium Memory Metal", *Journal of Chemical Education*, Vol. 71, No. 4 (April 1994).

The use of memory metals for coil spring micro-actuators is described in an article by Ikuta, et al., "Mathematical Model and Experimental Verification of Shape Memory Alloy for Designing Micro Actuator", *Proc. of the IEEE Conf. on Micro Electro Mechanical Systems*, Nara, Japan (1991), pp. 103–108. The article describes a coil spring made from a shape memory alloy, for the purpose of preventing fatigue from compressive and tensile forces.

SUMMARY OF THE INVENTION

One aspect of the invention is a method of fabricating a deflectable metal strip component of a micro-mechanical device, so as to provide a means for reversing mechanical distortion. In other words, during subsequent operation of the micro mechanical device, if the component is subjected to mechanical stress and becomes mechanically distorted, the distortion can be reversed. The component is fabricated from a metal capable of austenite/martensite phase changes in the solid state, such as a nickel titanium alloy. The metal has a transition temperature to the austenite phase that is above the expected operating temperature of the micro mechanical device. The component is formed in its desired shape, such as by etching or some other fabrication technique. It is then annealed so as to cause a transition to the austenite phase, thereby training the component in the austenite phase.

A variation of the invention is to fabricate, form, and anneal the component using a memory metal whose transition state is below the operating temperature of the device. In this case, mechanical stress causes a transition to the martensite phase. Once the stress is released, the metal returns to its original shape.

An advantage of the invention is that deflecting elements of micro mechanical devices can be restored to their original shape after continued operation has caused them to become mechanically distorted. This can be accomplished by raising the temperature of the deflecting component above the transition temperature. The useful life of such devices is greatly extended.

DETAILED DESCRIPTION OF THE INVENTION

For purposes of example, the following description is in terms of a particular type of micro mechanical device, a digital micro-mirror device (DMD), as used for imaging applications. As explained below, this type of device has tiny mirrors that tilt to reflect light to an image plane.

Images formed by a DMD can be used in display systems or in printing systems. Other applications of DMDs are possible that do not involve image formation, such as optical switching and steering and accelerometers. In some of these other applications, the "mirror" need not be reflective, and is sometimes referred to as a moveable "beam". Also, in some applications, the DMD is not necessarily operated in a digital mode. In general, the term "DMD" is used herein to include any type of micro-mechanical device having beam elements that respond to voltages applied to address electrodes by tilting about a deflecting hinge.

In the case of a DMD, the invention is directed to preventing creep and sag in thin metal hinges, which support the mirrors and twist so as to permit the mirrors to tilt. However, the invention is useful for other types of micro-mechanical devices that have metal components made from thin metal strips that deflect by bending or twisting. An example of a deflection by bending is in the case of micro accelerometers, which have thin metal strips that are fixed at one end (cantilevered) and bend in a springboard manner. In general, metal strip components that deflect by twisting or bending are prone to mechanical distortion, such as creep or sag, over continued operation of the device of which they are a component.

Figure 1:
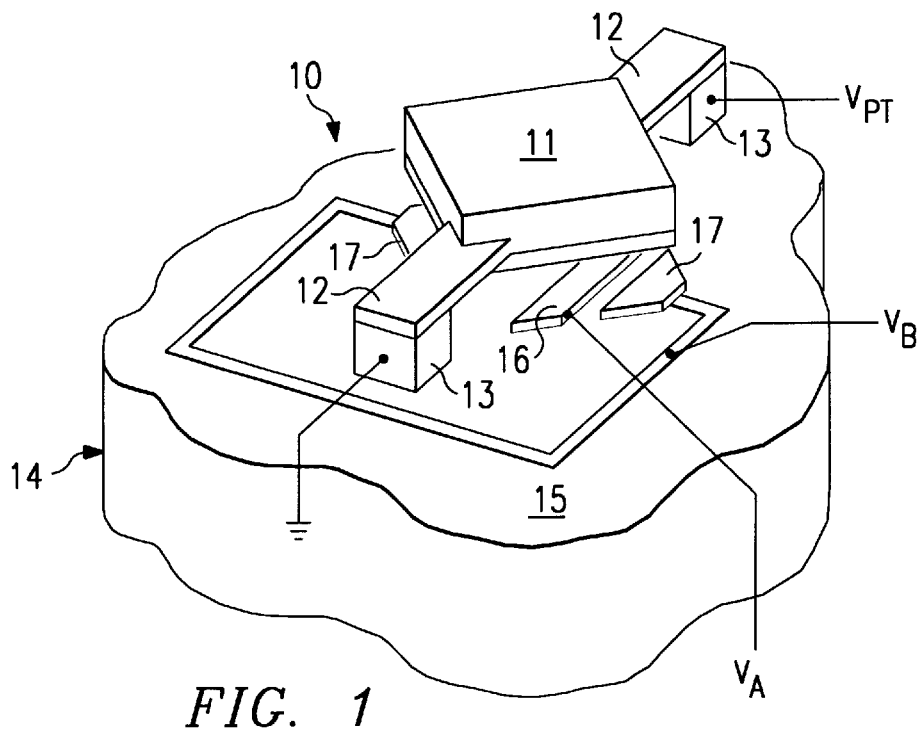
FIG. 1 illustrates a single mirror element of a digital micro mirror device (DMD), in the undeflected state.
Figure 2:
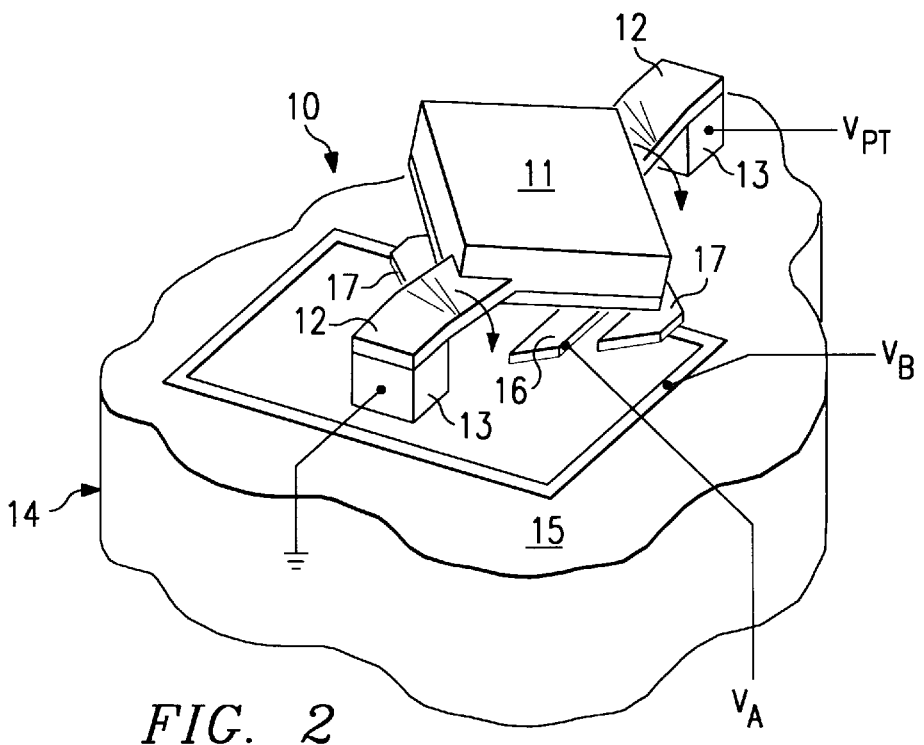
FIG. 2 illustrates the mirror element of FIG. 1 in a deflected state.

FIGS. 1 and 2 schematically illustrate a single mirror element 10 of a DMD. In FIG. 1, the mirror element 10 is in a flat (undeflected) state, whereas in FIG. 2, the mirror element is deflected.

The mirror element 10 of FIGS. 1 and 2 is known as a "torsion beam" mirror element. Other types of mirror elements 10 can be fabricated, including cantilever types and "hidden hinge" types. Hidden-hinge DMDs have a yoke under the mirror, to which the hinges are attached, which permits the mirrors to be more closely spaced together.

Various DMD types are described in U.S. Pat. No. 4,662,746, entitled "Spatial Light Modulator and Method", U.S. Pat. No. 4,956,610, entitled "Spatial Light Modulator", U.S. Pat. No. 5,061,049, entitled "Spatial Light Modulator and Method", and in U.S. Pat. No. 5,083,857, entitled "Multi-level Deformable Mirror Device". Each of these patents is assigned to Texas Instruments Incorporated and each is incorporated by reference herein.

In operation for display applications, a light source illuminates the surface of a DMD having an array of mirror elements 10. Each mirror element 10 has a tilting mirror 11 supported by torsion hinges 12 attached to support posts 13. The mirrors 11 are positioned over an address/memory circuit 14, which is fabricated on a silicon substrate 15. Electrostatic forces based on data in the memory cells of address/memory circuit 14 tilt mirror either +10 degrees (on) or −10 degrees (off), thereby modulating the light incident on the surface of the DMD. Light reflected from the on mirrors 11 is directed to a viewer, via various display optics (not shown). Light reflected from the off mirrors is directed away from the viewer. The pattern of on (bright) and off (dark) pixels creates an image. The proportion of time during each image frame period that any mirror 11 is on the on position determines shades of grey. Color can be added by means of a color wheel or by a multiple DMD setup.

Address/memory circuit 14 has a memory cell associated with each mirror element 10, as well as two address electrodes 16 and two landing electrodes 17. The mirror 11 has three states. It operates in a bistable mode, tilting 10 degrees about the hinges 12 in one or the other direction. The third state is a flat position to which the mirrors 11 return when the display is not in operation.

In effect, the mirror 11 and the address electrodes 16 form capacitors. A combination of address and bias voltages are used to change the mirror state. In one scheme, when +5 volts (digital 1) is applied to one address electrode 16, 0 volts (digital 0) is applied to the other address electrode 16, and a negative bias to the mirror 11, the electrostatic charge thus created sets up an electrostatic force. The address and bias voltages (VA and VB) are applied through address and bias lines. The bias voltage is pulsed and the combination of address and bias voltages cause mirror 11 to tilt toward the +5 volt electrode 16. This is but one example—many other addressing schemes are possible.

Once a mirror 11 tilts in either direction, it remains electro-mechanically latched in that state. Merely changing the states of the address electrodes 16 will not cause the mirror to move; it is removal of the bias on each mirror 11 that causes it to return to its untilted position. When the bias is reapplied, the mirror 11 tilts in accordance with its new address state.

DMDs, like other micro-mechanical devices, are manufactured using semiconductor fabrication techniques. The fabrication can occur at a wafer level, with the wafer being separated into individual DMD devices at the back-end of the fabrication process. The metal components, including hinges 12, may be fabricated by depositing a thin metal film and then etching the film to a desired structure.

A feature of the invention is the manufacture of hinges 12 from a memory metal. As discussed in the Background, a characteristic of a memory metal is that it can undergo phase transitions within its solid state. These phase changes can be responsible for shape memory effects. The memory metals that are the subject of the invention are of the type that undergo austenite/martensite transitions.

An example of such a memory metal is nickel-titanium (NiTi). NiTi has a 1:1 stoichiometry. The temperature where the phase transition occurs (the transition temperature) is a particularly sensitive function of NiTi's stoichiometry. Variations of a few percentage points around the equiatomic composition cause large changes (as much as 100 degrees centigrade) in the transition temperature. Tuning of the transition temperature can also be accomplished by substituting other metals for nickel. These metals include palladium, platinum, cobalt, and iron. In general, the transition temperature can be adjusted so as to occur within a large range around room temperature.

In the case of NiTi, the martensite (low temperature) phase is quite flexible. The higher temperature (austenite) phase is rigid and harder than the martensite phase. Transitions between these two phases can occur by changing the temperature of the metal.

Under certain conditions, phase transitions can also occur as a result of mechanical stress. Under such conditions, the austenite phase can be transformed mechanically into the martensite phase, where the metal becomes elastic. When the stress is removed, the martensite phase transforms back to the austenite phase and the metal returns to the shape it had in the austenite phase. This mechanical property is sometimes known as "superelasticity".

The shape recovery (memory) property of NiTi is a result of its crystal structure. NiTi is a polycrystalline material. In the austenite phase, NiTi has a highly symmetric "body centered cubic" structure. The transition from austenite to martensite involves shifts in atomic positions. The rectangular planes of the austenite structure slide out of alignment relative to one another and deform by shearing.

The transition from austenite to martensite phase can occur through at least 24 paths. Each of these variants ultimately transforms the structure into a configuration with the same energy state. These "equivalent orientations" permit the martensite phase to be mechanically flexible. However, each time the NiTi is returned to the austenite phase (with its rigid rectilinear structure) the nickel and titanium atoms return to the same position.

The process of training the metal to a new shape is accomplished by annealing the metal. Within the grains of the crystal structure, the nickel and titanium atoms are arranged with almost perfect order. However, dislocations and defects occasionally occur. A particular configuration of defects pins the metal in the austenite phase to a given shape. Annealing the metal at a sufficiently high temperature permits the atoms around the defects to gain enough energy to relax into new energy configurations. A new configuration of defects pins the austenite into a new position.

The memory effect of NiTi (or its variants) is observed by forming the metal into a desired shape and annealing it. This trains the austenite phase by pinning it into that shape. The metal is then cooled to the martensite phase. If the metal is deflected (twisted or bent) while in the martensite phase, the effect on the microstructure is a reorientation of the variants corresponding to the macroscopic change in shape. This reversible mechanism for accommodating stress prevents permanent deformation of the metal. If the metal is then heated into the austenite phase, the atoms recover their initial positions, and the initial macroscopic shape of the metal is restored. The heating is sufficient to cause a phase transition but not sufficient to readjust the defects in the atomic structure. As long as the metal is not deflected so far that it is permanently deformed, this process can be repeated ad infinitum.

In the case of DMD hinges 12, the "relaxed" state is the planar state. The hinges 12 can be initially trained in this state by annealing them during the fabrication process.

Figure 3:
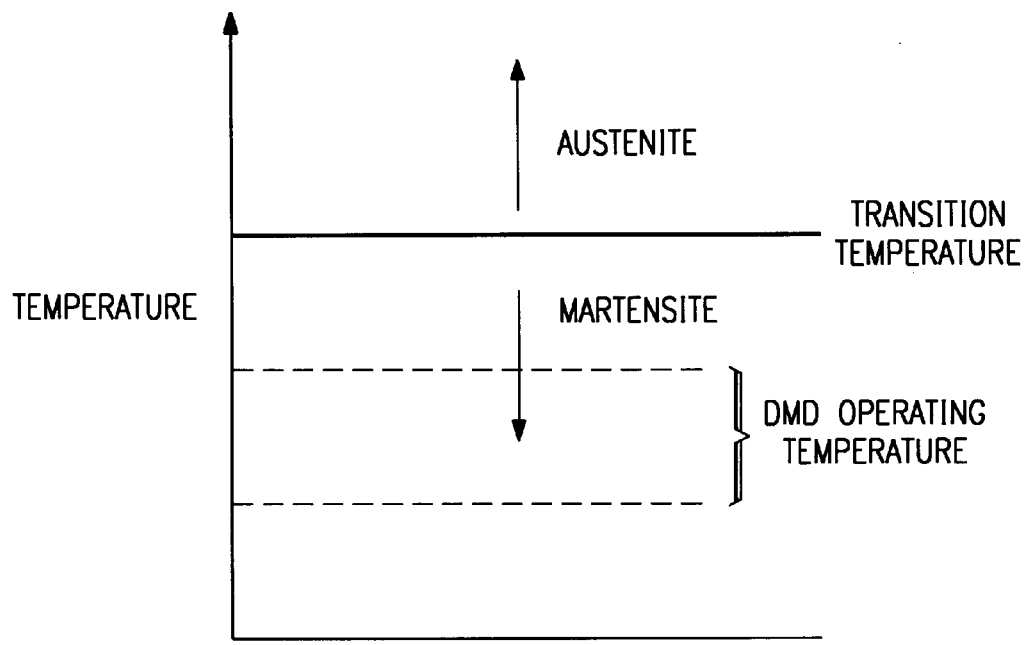
FIG. 3 illustrates the relationship between the transition temperature of the metal from which the hinges of FIGS. 1 and 2 are made and the operating temperature of the DMD, where the transition temperature is above the operating temperature.

FIG. 3 illustrates a transition temperature of the deflecting component (such as a hinge 12) that is above the operating temperature of the device (such as a DMD). This permits the component to be reshaped periodically by raising its temperature above the transition temperature. In other words, the device is operated with the component in the martensite phase. Creep or sag induced during operation is removed by causing the structure of the austenite phase to return. The raise in temperature for the transition can be accomplished after the device is "turned off" after use, in a manner similar to degaussing of cathode ray tubes.

Figure 4:
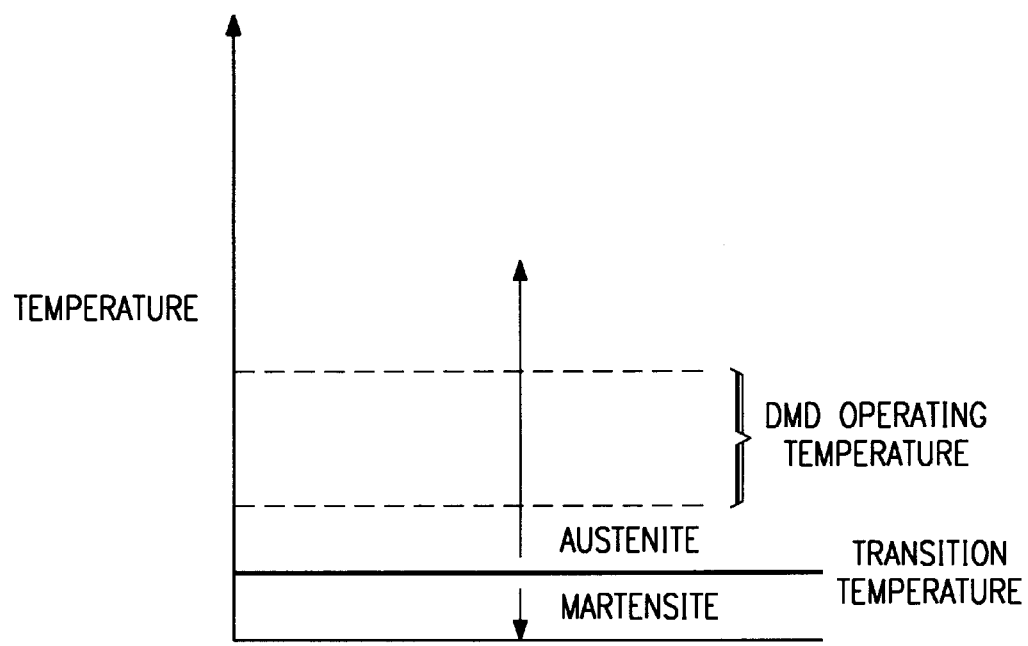
FIG. 4 illustrates the relationship between the transition temperature of the metal from which the hinges of FIGS. 1 and 2 are made and the operating temperature of the DMD, where the transition temperature is below the operating temperature.

FIG. 4 illustrates a transition temperature of the deflecting component (such as a hinge 12) that is below the operating temperature of the device (such as a DMD). In this case, the deflecting motion of the component during operation will induce stress in the component's metal. Instead of creating defects in the metal, this stress causes the metal to change from the austenite phase to the martensite phase. Once the stress is released, the reverse phase transition occurs and the component returns to its original shape. The phase transitions manage the induced stress and prevent defects.

Both annealing and phase transitions can be accomplished with either global or localized thermal heating. For example, annealing during fabrication can be accomplished with global heating by placing the device in an oven.

It is also possible to heat the component by passing an electrical current through it. For example, a device that has been in operation could be thermal-electrically heated, such as by using a heat sink upon which the device rests, so as to cause a phase transition.

Referring again to FIGS. 1 and 2, in the case of DMD mirror elements 10, the hinges 12 can be locally heated by means of an electrical current. An electrical connection provides a voltage, $V_{PT}$, that is sufficient for annealing or for a phase transition and is applied across the hinges 12. Alternatively, existing bias/reset or address lines could be used with appropriate switching to direct the current through hinges 12 and not to components where the current is not desired. The thinness of the hinge 12 results in high resistivity and the hinge 12 heats more than other DMD components. The heat will be transferred to other components and dissipated. The total heat transfer can be small. The current can be AC or DC and could be applied as a single pulse or series of pulses.

For annealing, the heating is at a higher temperature than for phase transitions. During annealing, the heat is sufficient to train the hinge 12 in the undeflected state of FIG. 1. After the DMD has been operated for some time (in the martensite phase), the mirror elements 10 are heated to a temperature sufficient to cause a phase transition to the austenite phase. This triggers the memory characteristic of the hinge metal. The amount of heating can be controlled by the amount of current and duration of the pulse(s).

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A method of fabricating a micro-mechanical device having a deflectable metal strip component, said micro-mechanical device having an expected operating temperature such that mechanical distortion during operation of the device is reversible, comprising the steps of:

providing a metal capable of phase changes in the solid state and having a phase transition temperature that is above said operating temperature;

fabricating said component from said metal;

forming said component to its desired shape;

applying an electrical current through said component to anneal said component to cause a phase transition of said component to train said component in one said phase; and completing fabrication of said device;

further including the steps of utilizing the completed device and then periodically applying said electrical current through said component to again cause said phase transition.

2. The method of claim 1, wherein said component is a hinge.

3. The method of claim 2, wherein said device is a digital micro mirror device.

4. The method of claim 1, wherein said component is a cantilevered metal strip, fixed at one end.

5. The method of claim 1, wherein said phase changes are austenite/martensite phase changes and said annealing step causes a transition to said austenite phase.

6. The method of claim 1, wherein said metal is primarily nickel titanium.

7. The method of claim 1 further including the steps of utilizing the completed device and then periodically applying said electrical current through said component to again cause said phase transition.

8. A method of fabricating a micro-mechanical device having a deflectable metal strip component, said micro-mechanical device having an expected operating temperature such that mechanical distortion during operation of the device is reversible, comprising the steps of:

providing a metal film capable of phase changes in the solid state and having a phase transition temperature that is below said operating temperature;

fabricating said component from said metal film such that deflection of said component will result in a phase change of said component to a first said phase;

forming said component to its desired shape;

applying an electrical current through said component to anneal said component to cause a phase transition of said component to train said component in one said phase; and completing fabrication of said device;

further including the steps of utilizing the completed device and then periodically applying said electrical current through said component to again cause said phase transition.

9. The method of claim 8, wherein said component is a hinge.

10. The method of claim 8, wherein said device is a digital micro mirror device.

11. The method of claim 8, wherein said component is a cantilevered metal strip, fixed at one end.

12. The method of claim 8, wherein said phase changes are austenite/martensite phase changes and said annealing step causes a transition to said austenite phase.

13. The method of claim 8, wherein said metal is primarily nickel titanium.

14. The method of claim 8 further including the steps of utilizing the completed device and then periodically applying said electrical current through said component to again cause said phase transition.

15. A method of fabricating a micro-mechanical device having a deflectable metal strip component, said micro-mechanical device having an expected operating temperature such that mechanical distortion during operation of the device is reversible, comprising the steps of:

providing a metal capable of phase changes in the solid state and having a phase transition temperature that is above said operating temperature;

fabricating said component from said metal;

forming said component to its desired shape;

applying an electrical current through said component to anneal said component to cause a phase transition of said component to train said component in one said phase; and completing fabrication of said device;

wherein said step of applying an electrical current is provided during fabrication of said device.

16. The method of claim 15 wherein said component is a hinge.

17. The method of claim 16 wherein said device is a digital micro mirror device.

18. The method of claim 15 wherein said component is a cantilevered metal strip, fixed at one end.

19. The method of claim 15 wherein said phase changes are austenite/martensite phase changes and said annealing step causes a transition to said austenite phase.

20. The method of claim 15 wherein said metal is primarily nickel titanium.

21. A method of fabricating a micro-mechanical device having a deflectable metal strip component, said micro-mechanical device having an expected operating temperature such that mechanical distortion during operation of the device is reversible, comprising the steps of:

providing a metal film capable of phase changes in the solid state and having a phase transition temperature that is below said operating temperature;

fabricating said component from said metal film such that deflection of said component will result in a phase change of said component to a first said phase;

forming said component to its desired shape;

applying an electrical current through said component to anneal said component to cause a phase transition of said component to train said component in one said phase; and completing fabrication of said device;

wherein said step of applying an electrical current is provided during fabrication of said device.

22. The method of claim 21 wherein said component is a hinge.

23. The method of claim 22 wherein said device is a digital micro mirror device.

24. The method of claim 21 wherein said component is a cantilevered metal strip, fixed at one end.

25. The method of claim 21 wherein said phase changes are austenite/martensite phase changes and said annealing step causes a transition to said austenite phase.

26. The method of claim 21 wherein said metal is primarily nickel titanium.

* * * * *

UNITED STATES PATENT AND TRADEMARK OFFICE
CERTIFICATE OF CORRECTION

PATENT NO: 6,072,617
DATED: June 6, 2000
INVENTOR(S): Steven A. Henck

It is certified that error appears in the above-identified patent and that said Letters Patent are hereby corrected as shown below:

Cover Page, insert Item [60] under Related U.S. Application Data

--Provisional Application No. 60/031,803  Nov. 26, 1996.--

Signed and Sealed this

Twenty-fourth Day of April, 2001

Attest:

NICHOLAS P. GODICI

*Attesting Officer*    *Acting Director of the United States Patent and Trademark Office*